United States Patent [19]
Begun

[11] 4,340,035
[45] Jul. 20, 1982

[54] SOLAR COLLECTOR

[76] Inventor: James A. Begun, 25 State St., Montpelier, Vt. 05602

[21] Appl. No.: 143,171

[22] Filed: Apr. 24, 1980

[51] Int. Cl.³ ............................................. F24J 3/02
[52] U.S. Cl. .................................. 126/438; 126/443; 126/901
[58] Field of Search ............... 126/446, 443, 449, 438, 126/901, 417, 450, 442, 441

[56] References Cited

U.S. PATENT DOCUMENTS

| | | | |
|---|---|---|---|
| 1,575,309 | 3/1926 | Anderson | 126/443 |
| 3,974,824 | 8/1976 | Smith | 126/438 |
| 3,978,272 | 8/1976 | Donley | 126/901 |
| 4,011,855 | 3/1977 | Eshelman | 126/438 |
| 4,038,964 | 8/1977 | Drew | 126/438 |
| 4,038,971 | 8/1977 | Bezborodko | 126/438 |
| 4,055,707 | 10/1977 | McDonald | 126/901 |
| 4,056,313 | 11/1977 | Arbogast | 126/438 |
| 4,059,093 | 11/1977 | Knowles et al. | 126/443 |
| 4,068,474 | 1/1978 | Dimitroff | 126/439 |
| 4,074,678 | 2/1978 | Posnansky | 126/443 |
| 4,091,796 | 5/1978 | Bieringer | 126/443 |
| 4,116,221 | 9/1978 | Zaugg et al. | 126/438 |
| 4,134,391 | 1/1979 | Mahdjuri et al. | 126/438 |
| 4,228,220 | 10/1980 | Garrison | 126/901 |
| 4,273,098 | 6/1981 | Silverstein | 126/417 |
| 4,281,641 | 8/1981 | Devore | 126/449 |

FOREIGN PATENT DOCUMENTS

| | | | |
|---|---|---|---|
| 2461973 | 7/1975 | Fed. Rep. of Germany | 126/443 |
| 2843571 | 4/1980 | Fed. Rep. of Germany | 126/901 |
| 4805 | 10/1979 | France | 126/443 |
| 2023807 | 1/1980 | United Kingdom | 126/443 |

Primary Examiner—Daniel J. O'Connor
Attorney, Agent, or Firm—Eric Y. Munson

[57] ABSTRACT

A solar collector is provided having an inner core for absorbing solar radiation enclosed within a polygonal shaped glass housing. The inner core includes a series of outwardly extending projections which extend towards the inner surface of the glass housing and a fluid passageway is defined within the inner core. The core and its projections are either made from or coated with a material capable of absorbing solar radiation and emitting infrared radiation. The glass housing, which is substantially opaque to infrared radiation, maintains such infrared radiation emitted by the core within the triangular housing, and thus proximate to the central core. In this manner, a substantial portion of the heat energy of the emitted infrared radiation is transferred to fluid flowing through the fluid passageway within the core, and is not lost by convection. Flat mirrors can be used to direct solar energy to the glass housing and core.

11 Claims, 3 Drawing Figures

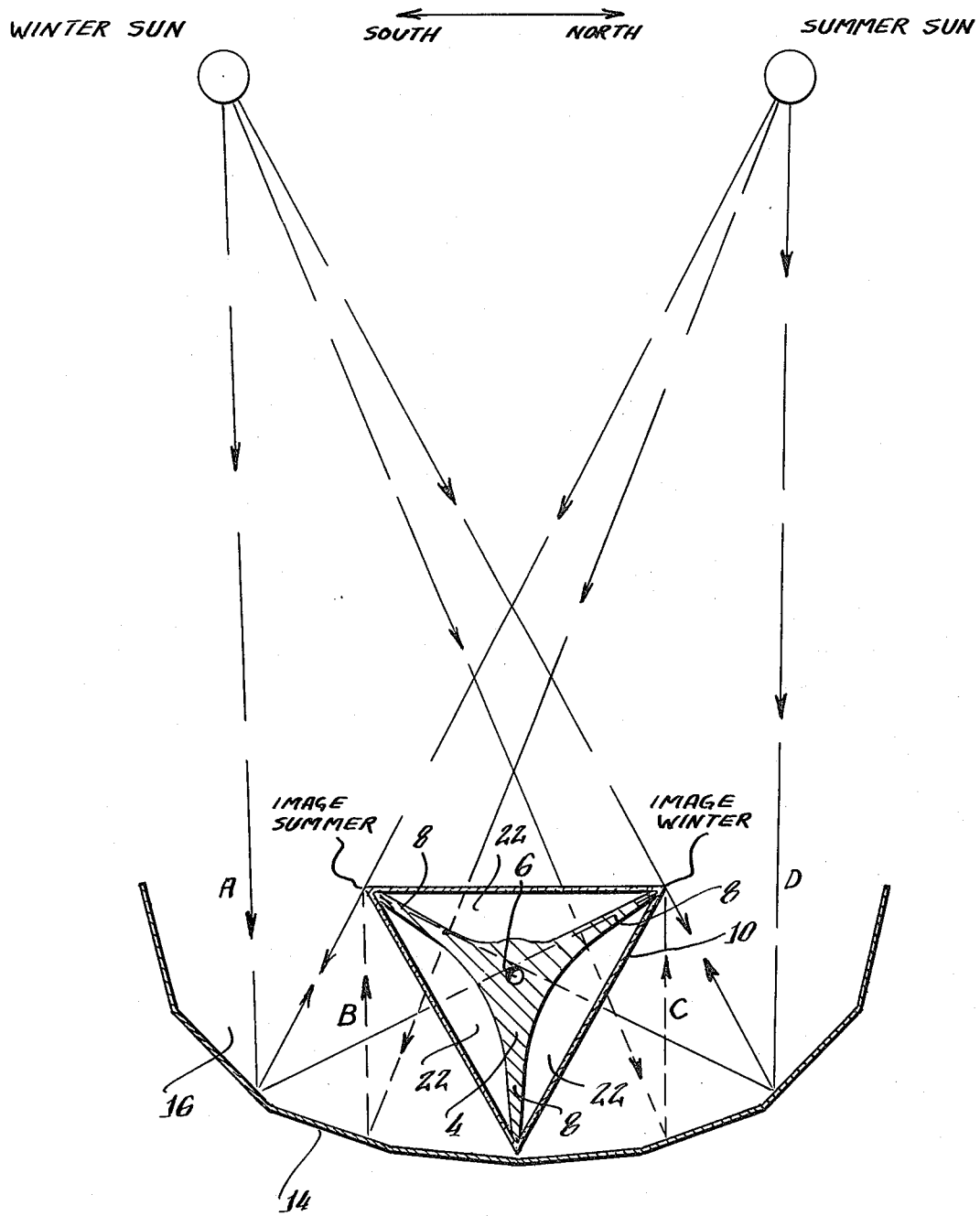

SOLAR COLLECTOR

BACKGROUND OF THE INVENTION

The present invention relates to solar collectors of the type having a central core for absorbing solar energy and for transmitting heat to a fluid flowing through the core.

Solar collectors known generally to the art are illustrated by the following United States patents.

(1) Smith, U.S. Pat. No. 3,974,824, Aug. 17, 1976
(2) Eshelman, U.S. Pat. No. 4,011,855, Mar. 15, 1977
(3) Drew, U.S. Pat. No. 4,038,964, Aug. 2, 1977
(4) Arbogast, U.S. Pat. No. 4,056,313, Nov. 1, 1977
(5) Dimitroff, U.S. Pat. No. 4,068,474, Jan. 17, 1978
(6) Bieringer, et al, U.S. Pat. No. 4,091,796, May 30, 1978
(7) Zaugg et al, U.S. Pat. No. 4,116,221, Sept. 26, 1978
(8) Mahdjuri et al, U.S. Pat. No. 4,134,391, Jan. 16, 1979

The basic concept of the present invention, which will be discussed in much greater detail below, is to provide a central core having a series of outwardly extending radial projections. The core is either formed from or coated with a material capable of absorbing energy in the visible wavelength spectrum and emitting infrared heat energy which is transferred to fluid flowing in a fluid flow passageway defined within the core. The core is enclosed within a glass housing. The glass housing conducts solar energy in the visible wavelength spectrum but reflects infrared radiation. Accordingly, visible wavelengths of solar energy penetrate the glass housing and are absorbed by the core which emits a corresponding quantity of infrared radiation. Because of the reflective quality of the glass housing, such emitted infrared radiation is maintained within the glass housing proximate to the inner core for heat transfer to the fluid in the passageway.

It is not believed that any of the aforementioned patents suggest a solar collector embodying the above discussed concept. Of these patents, Smith, Eshelman and Mahdjuri et al appear to be the most relevant. FIG. 7 of Smith discloses a thermally conductive shroud 68 with a pipe 67 extending longitudinally through the shroud. However, there is no suggestion that the shroud should be glass to reflect infrared radiation, or that the inner pipe should have outwardly extending projections directed towards the shroud. The Eshelman patent discloses an absorbing member 52 (See FIG. 3) having three radially outwardly extending members. However, there is no suggestion in this patent that the absorber should be enclosed within a glass housing. The Mahdjuri et al patent discloses a solid body 7 having axially extending projections 11. However, the primary purpose of the projections is to define a fluid passageway, and not to conduct heat from a convection chamber to a central fluid passageway defined through a central chamber. Additionally, the Mahdjuri et al patent is directed to a tube type collector, which is distinct from that of the present invention.

SUMMARY OF THE INVENTION

The present invention provides a solar collector having an inner core capable of absorbing solar energy and emitting infrared radiation. A passageway is defined through the inner core to enable fluid flowing through that passageway to receive energy transferred from the radiating inner core in the form of heat.

The core is enclosed within a glass housing. Glass transmits energy in the visible wavelength range, but reflects infrared radiation. As such, solar radiation in the visible range of the spectrum will be transmitted through the glass housing towards the inner core, but infrared radiation will be reflected by the glass housing. The inner core is formed from or coated with material that absorbs the transmitted energy and emits a corresponding quantity of infrared radiation. Because of the reflective nature of the glass enclosure, infrared radiation emitted by the core is confined within the glass housing, and thus maintained proximate to the core. As such, a substantial portion of the infrared radiation emitted by the core within the glass housing is transferred as heat to the fluid flowing through the passageway defined in the core.

The core includes a series of outwardly directed projections which extend proximate to or abut against the inner surface of the glass enclosure. This configuration of the core optimizes the quantity of energy transmitted through the glass enclosure that is absorbed by the core, and minimizes the heat loss due to convection escaping from the sealed glass housing. The invention further contemplates the use of flat mirrors arranged to direct solar energy on the glass housing.

The inner glass housing is enclosed within an insulated outer housing to insulate the inner glass housing from its outside environment. Such insulation can be provided by a dead air space defined between the mirrors and an upper glass top mounted above the collector. In this manner, heat flow from within the inner glass enclosure to the outside environment is retarded.

The specific features and operations of the preferred embodiment of the new solar collector will be discussed in further detail in conjunction with the drawings as follows.

BRIEF DESCRIPTION OF THE DRAWINGS

FIG. 3 shows the solar collector and a ray diagram showing the path of incident solar radiation at different times of the year representing the most extreme positions of the sun.

DESCRIPTION OF THE PREFERRED EMBODIMENT

Figure 1:
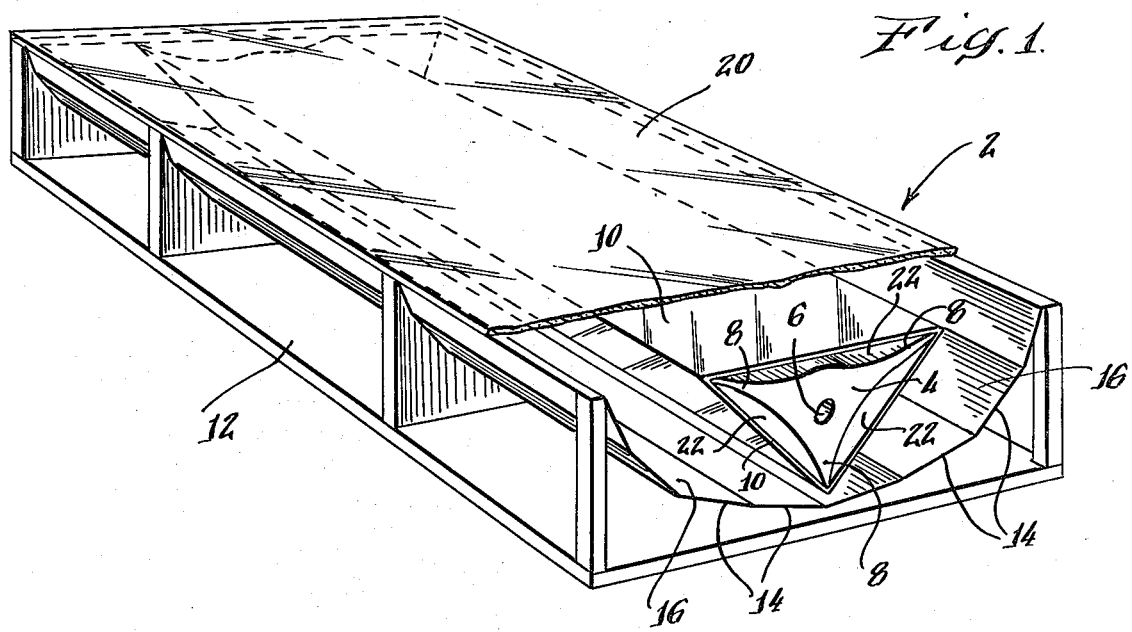
FIG. 1 is a perspective view of a solar collector in accordance with the present invention.

The present invention relates to an improved solar collector and will be described with reference to FIGS. 1–3 of the drawings.

However, before discussing the preferred embodiment of the invention as disclosed in the drawings, it will be helpful to note some basic principles which are important to the understanding of the invention.

It is first significant to note that the solar constant is a measure of radiant energy at the outer limits of the earth's atmosphere. Forty-six percent of this light reaches the earth's surface, and of this amount, approximately fifty percent is in the form of infrared or heat waves.

Secondly, it is important to note that glass is substantially opaque to infrared radiation, reflecting these rays like a mirror. That is, infrared radiation is not transmitted through glass with the exception of the transmission of a small amount of very short infrared wavelengths.

The present invention uses the above principles to provide an improved solar collector as will now be discussed with reference to the drawings.

Figure 2:
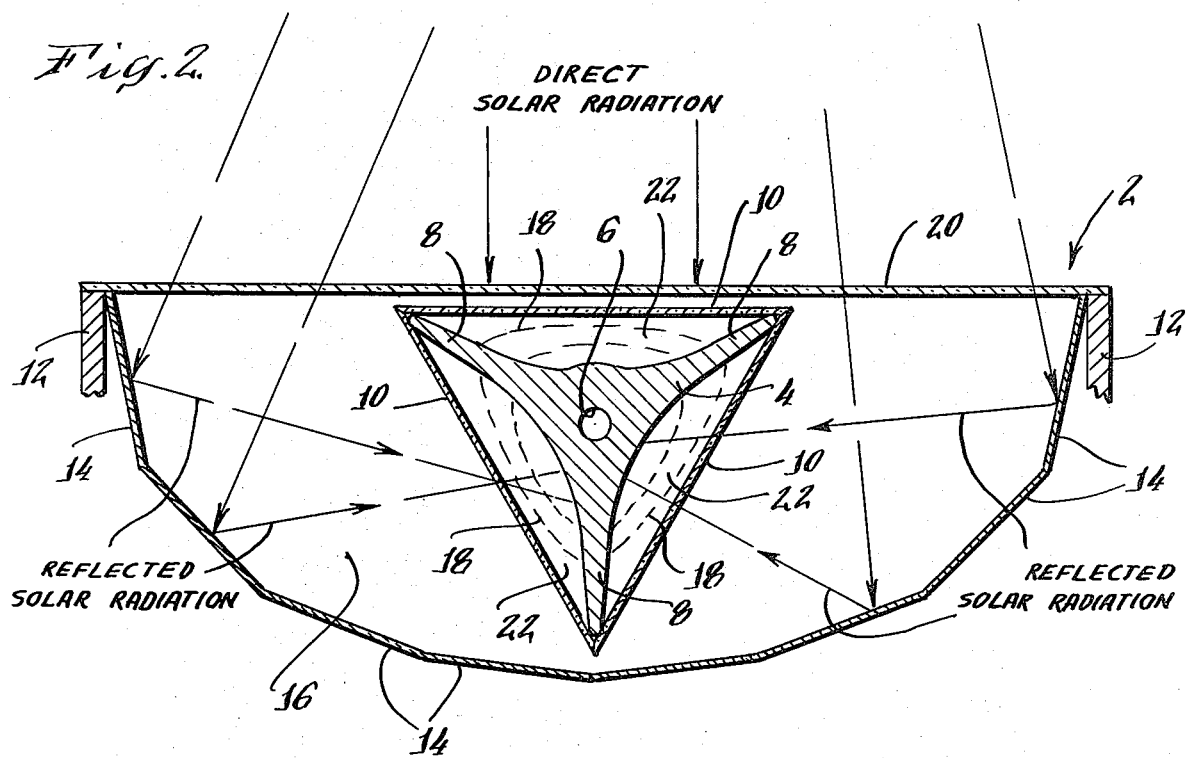
FIG. 2 is a cross sectional view of the absorbing core and the surrounding glass housing of the solar collector shown in FIG. 1.

Referring to FIGS. 1 and 2, numeral 2 generally designates the subject solar collector. It includes a central core 4 having a channel 6 extending longitudinally therethrough. The central core is formed from or coated with a material which absorbs visible wavelengths of light and emits a corresponding quantity of infrared radiation or heat energy. For example, the core can be formed from a blackened metal, as for example, aluminum, or it can be coated with a stable, high absorptive electroplating metal such as platinum black, nickel electroplating or chromium oxide. Black anodized aluminum is the preferred choice of absorbing material. The channel 6 provides a passageway for fluid flow through the central core 4.

The central core 4 includes three equally spaced radial extensions 8. The core is enclosed within a glass housing 10 shaped, in its cross section, as an equilateral triangle. Each of the radial extensions 8 of the central core extends towards a different corner of the triangular glass housing. In the preferred embodiment, the extending ends of the radial members 8 abut directly against the inner surface of the triangular housing at its three corners as is shown in FIG. 2. The triangular housing is positioned so that one of its bases faces directly upwardly.

The inner housing itself is mounted within an outer housing 12, as shown in FIG. 1. A plurality of plane mirrors 14 are arranged to form a concave surface which generally surrounds the lower portion of the inner glass housing 10. The mirrors are arranged to reflect incident solar radiation along the length of the inner housing and the central core therein. A top sheet of glass 20, which is spaced slightly above the top of the inner glass housing, extends across the top of the entire collector.

A dead air space chamber 16 is provided between the front surfaces of the plane mirrors 14 and the top glass sheet 20. The outer housing 12 can also be insulated in a conventional manner to further insulate the central core 4 and the inner housing 10 from the ambient environment to retard heat loss from the central core in addition to the insulation provided by the dead air space chamber 16.

In operation, solar energy either directly impinges on the upwardly directed base of the inner housing 10 or is reflected towards the sides of the inner housing 10 by the plane mirrors 14. As discussed above, glass is opaque to infrared radiation, and as such, the portion of the incident solar radiation that consists of infrared radiation is reflected by the glass housing. Thus, only the portion of the solar radiation consisting of the visible wavelengths of light penetrates the inner glass housing. The entering wavelengths of light are absorbed by the central core 4 and its radial extensions 8. Because the extensions 8 extend towards the inner surface of the glass housing, a substantial quantity of entering energy is absorbed by either the radial extensions 8 or the central core 4. The radial extensions 8 enhance the quantity of entering radiation absorbed by the core to increase the efficiency of the solar collector by absorbing a substantial portion of such entering radiation, thereby minimizing loss of such energy.

The core emits a quantity of infrared radiation or heat energy corresponding to the quantity of energy absorbed by it. This heat energy is maintained within the inner glass housing proximate to the central core because the inner glass housing is opaque to the infrared radiation and does not transmit such radiation outwardly, but continues to reflect it towards the central core. As such, the central core 4 and the relatively small space within the glass housing are maintained at a high temperature to enhance the quantity of heat energy transferred to fluid flowing through the channel 6 which extends longitudinally through the center of the inner core. Accordingly, the present solar collector optimizes the quantity of heat energy transferred to the flowing fluid by preventing dissipation of such heat energy generated by the central core. The concentric circles 18 of FIG. 2 represent the infrared or heat energy within the glass housing 10 enclosing the central core.

Because the plane mirrors 14 extend longitudinally with the inner housing and its core 4, incident solar energy is reflected by these mirrors along the length of the inner housing, not just at a selected point or range. Use of plane mirrors instead of more sophisticated and expensive optical elements, as is now generally used in the art, is economical and decreases the cost of the manufacture of the solar collector.

As noted above, the outer housing 12 is provided with conventional insulation to retard any heat flow from the inner housing to the outside environment. Additionally, the dead air space chamber 16 defined between the front surface of the plane mirrors 14 and the glass top 20 serves to further insulate the inner glass housing 10 and retard heat flow therefrom to the ambient environment.

It becomes apparent that the shape of the central core 4 and its radial extensions 8 satisfies both the optical and thermal conditions for optimum solar collection. Referring to FIG. 3, a ray diagram shows incident solar radiation from both the summer and winter sun at its extreme positions. Halfway between these two solar positions corresponds to the sun's position at the vernal and autumnal equinox. The broken lines represent the virtual path of the incident solar radiation. As illustrated, the shape of the central core 4 and radial extensions 8 is such that, together with the arrangement of the plane mirrors 14, the virtual image of the sun will always fall between the two upper radial extensions 8 regardless of its position in the sky. This eliminates the need for any adjustments of the solar collector throughout the year.

It is also apparent from FIGS. 2 and 3 that the surfaces of the central core 4 are concave inwardly. This defines convection chambers between the core and the inner housing 10. Each of the core surfaces, because of its concave curve, receives incident rays along the full normal (that is, rays strike the core perpendicularly to the core's surface). This reduces loss of absorption incurred by light entering obliquely, a loss proportional to the cosine of the angle of incidence. Radial extensions 8 which along with the inner glass housing 10 define convection chambers 22, expand inwardly from their peripheral limits, thus enhancing the conductive heat stream toward the central fluid passageway 6.

The present invention as discussed above provides an improved solar collector which optimizes heat transfer to a fluid medium. The embodiment discussed herein is illustrative of the invention. However, variations of that embodiment will become apparent to those skilled in the art. For example, the cross section of the inner glass housing can be configured to be other than an equilateral triangle. In fact, any closed shaped glass housing should work satisfactorily in the disclosed solar collector. Additionally, there may be more or less than three radially extending members from the central core, and such members do not necessarily have to be spaced equidistantly from each other. Although it is desirable that the number of radial extensions should at least be equal to the number of sides of the glass housing, this too is not an absolute requirement of the invention. Furthermore, although the discussed embodiment illustrates that the radially extending members of the central core are directed towards the corners of the inner glass housing, these members can also be directed to portions of the inner surface of the housing away from the corners.

Accordingly, the discussed embodiment of the solar collector is intended to be illustrative but not restrictive of the scope of the invention, that scope being defined by the following claims and all equivalents thereto.

I claim:

1. In a solar energy collector of the type including an inner core for absorbing energy and a fluid flow passageway defined in said inner core through which fluids flow to receive heat energy transferred thereto from said inner core, the improvement comprising:
   a triangular shaped glass housing enclosing said inner core and extending longitudinally therewith,
   said glass housing reflecting infrared radiation directed thereon but transmitting visible wavelengths of energy inwardly therethrough towards said inner core,
   said inner core having three outwardly extending projections that extend proximate to the inner surface of said glass housing for absorbing said visible wavelengths of energy transmitted through said glass housing, each of said three outwardly extending projections being directed towards a different corner of said triangular glass housing,
   said inner core and said outwardly extending projections being coated with a material adapted to absorb said visible wavelengths of energy and emit a corresponding quantity of infrared energy,
   a plurality of flat mirrors arranged for reflecting solar energy towards said triangular glass housing, and
   a heat insulated outer chamber for enclosing said inner triangular glass housing and for providing insulation between said inner triangular glass housing and its surrounding environment to retard heat transfer from within said inner triangular glass housing to said surrounding environment, said outer chamber being defined between said plurality of flat mirrors and a sheet of glass above said inner glass housing,
   whereby said infrared energy radiated by said inner core is maintained proximate to said inner core by the reflective effect of the inner surface of said glass housing so that a substantial portion of said infrared energy radiated by said inner core is transferred to fluid within said fluid flow passageway defined through said inner core.

2. A solar collector as claimed in claim 1 wherein at least one of said outwardly extending projections abuts against the inner surface of said triangular glass housing.

3. A solar collector as claimed in claim 1 wherein the outer ends of each of said three outwardly extending projections abut against said respective different corners of said triangular glass housing.

4. A solar collector as claimed in claim 1 wherein said inner core is formed from a blackened metal.

5. A solar collector as claimed in claim 4 wherein said inner core is formed from black anodized aluminum.

6. A solar collector as claimed in claim 1 wherein said inner core is coated with a stable, highly absorptive electroplating metal.

7. A solar collector as claimed in claim 6 wherein said coating material is platinum black.

8. A solar collector as claimed in claim 6 wherein said coating material is a nickel.

9. A solar collector as claimed in claim 6 wherein said coating material is a chromium oxide.

10. A solar collector as claimed in claim 1 wherein said inner core and at least one of said outwardly extending projections defines a concave outer surface.

11. In a solar energy collector of the type including an inner core for absorbing energy and a fluid flow passageway defined in said inner core through which fluids flow to receive heat energy transferred thereto from said inner core, the improvement comprising:
    a triangular shaped glass housing enclosing said inner core and extending longitudinally therewith,
    said glass housing reflecting infrared radiation directed thereon but transmitting visible wavelengths of energy inwardly therethrough towards said inner core,
    said inner core having three outwardly extending projections that extend proximate to the inner surface of said glass housing for absorbing said visible wavelengths of energy transmitted through said glass housing, each of said three outwardly extending projections being directed towards a different corner of said triangular glass housing,
    said inner core and said outwardly extending projections being coated with a material adapted to absorb said visible wavelengths of energy and emit a corresponding quantity of infrared energy,
    a mirrored surface arranged for reflecting solar energy towards said triangular glass housing, and
    a heat insulated outer chamber for enclosing said inner triangular glass housing and for providing insulation between said inner triangular glass housing and its surrounding environment to retard heat transfer from within said inner triangular glass housing to said surrounding environment, said outer chamber being defined between said mirrored surface and a sheet of glass above said inner glass housing,
    whereby said infrared energy radiated by said inner core is maintained proximate to said inner core by the reflective effect of the inner surface of said glass housing so that a substantial portion of said infrared energy radiated by said inner core is transferred to fluid within said fluid flow passageway defined through said inner core.

* * * * *